United States Patent [19]

Slagle

[11] 4,250,451

[45] Feb. 10, 1981

[54] MAGNETIC INDUCTION IMAGING SYSTEM

[75] Inventor: Glenn B. Slagle, McLean, Va.

[73] Assignee: Cordless Power Corporation, McLean, Va.

[21] Appl. No.: 973,873

[22] Filed: Dec. 28, 1978

[51] Int. Cl.³ .................. G01R 33/00; G01N 27/72
[52] U.S. Cl. ................................. 324/239; 324/228; 324/200; 324/243; 324/262
[58] Field of Search ............... 324/200, 228, 233, 234, 324/293, 243, 262; 358/110; 340/551

[56] References Cited

U.S. PATENT DOCUMENTS

| | | |
|---|---|---|
| 2,560,834 | 7/1951 | Whitehead et al. |
| 2,626,308 | 1/1953 | Schmitt |
| 2,735,980 | 2/1956 | Wait |
| 2,744,235 | 5/1956 | Breit |
| 3,166,710 | 1/1965 | Schmidt |
| 3,469,182 | 9/1969 | Wycherley et al. |
| 3,686,564 | 8/1972 | Mallick, Jr. et al. |
| 3,763,424 | 10/1973 | Bennett, Jr. et al. |
| 3,777,255 | 12/1973 | Young et al. |
| 3,868,565 | 2/1975 | Kuipers |
| 4,012,690 | 3/1977 | Heytow |
| 4,061,966 | 12/1977 | Sedlalck et al. |

FOREIGN PATENT DOCUMENTS

| | | | |
|---|---|---|---|
| 2161138 | 6/1973 | Fed. Rep. of Germany | |
| 182388 | 7/1966 | U.S.S.R. | 324/200 |
| 1240194 | 7/1971 | United Kingdom | 324/200 |

*Primary Examiner*—Gerard R. Strecker
*Assistant Examiner*—Walter E. Snow
*Attorney, Agent, or Firm*—Brady, O'Boyle & Gates

[57] ABSTRACT

Disclosed is a metallic imaging system for detecting and visually displaying the shadow projection of a diamagnetic metallic object immersed in a point source magnetic induction field. In a preferred embodiment of the invention, the object is located intermediate a magnetic induction point source transmitter operating, for example, in the 100kHz range and a magnetic receiver consisting of a scanner adapted for two dimensional movement in a projection plane substantially normal to the axial projection of the magnetic induction field. The output of the scanner comprises magnetic phase and amplitude variation signals which are converted to video signals and thereafter fed to an imaging device for producing a display in the form of a television like visual presentation of the projected magnetic shadow image.

15 Claims, No Drawings

MAGNETIC INDUCTION IMAGING SYSTEM

BACKGROOUND OF THE INVENTION

The present invention relates to metal detecting apparatus and more particularly to a system for producing a visual image of the magnetic shadow cast by an object immersed in a point source magnetic induction field.

While many systems are known for detecting magnetic bodies, most of the known prior art methods and devices lack the capability of providing a visual image of the physical features of the magnetic bodies being detected. While some systems do attempt to classify the geometric parameters characterizing the magnetic body, such systems require sophisticated and relatively complex apparatus.

It is an object of the present invention, therefore, to provide a new and improved means of detecting the size and shape of a metallic object hidden from view of one attempting to determine its geometric parameters.

It is still another object of the present invention to produce a television-like visual presentation of the projected magnetic shadow image of a metallic object under investigation.

Another object of the present invention is to provide an environmentally harmless detecting system of metallic objects which are particularly adapted for not only the sub-surface detection of such objects, but also for detection of such objects in security systems as are currently being utilized at airport terminals for detection of concealed weapons and the like.

SUMMARY

This invention is based upon the discovery that a diametallic metal object immersed in a point source AC magnetic induction field projects a magnetic shadow image analogous to the shadow image projected by an optical or X-ray point source. This magnetic induction shadow image consists of a phase variation as well as a decrease in field intensity from the unobstructed magnetic induction field.

Briefly, the subject invention is directed to an imaging system for detecting and displaying the shadow projection of an object located intermediate a point source magnetic induction field transmitter and an image or reference plane of projection oriented substantially perpendicular to the axis of symmetry of the magnetic field. The point source producing the magnetic field consists of a dipole source of relatively small size compared to the object size and/or at a large distance from both object and image plane. The relationship between dipole source size and separation distance between source and image plane is such that the mean transverse angle subtended by the dipole at a point in the image plane is less than one-third the average mean transverse angle subtended by the object from the same point in the image plane, meaning that the source is either small compared to the size of the object or is removed to a distance from the image plane which is large compared to the separation distance between object and image plane. Magnetic receiver means are located at the image plane and are adapted to provide a two dimensional scan of the phase variation/field intensity over a predetermined plane or region with the output being fed to the magnetic signal converter means which are adapted to provide suitable output signals, which when fed to an imager such as a cathode ray tube oscilloscope or the like, presents a visual display of the object's cross section relative to the axis of symmetry of the point source magnetic induction field.

BRIEF DESCRIPTION OF THE DRAWINGS

FIG. 1 is a diagram broadly illustrative of the inventive concept of the subject invention;

FIG. 2 is a diagram partially in block diagram form which is broadly illustrative of the preferred embodiments of the subject invention;

FIGS. 3A, 3B and 3C are electrical diagrams illustrative of three typical means for generating a point source magnetic induction field;

FIG. 4 is a block diagram illustrative of a first type of magnetic scanner consisting of a stationary array of magnetic induction search coils scanned in a predetermined pattern;

FIG. 5 is a block diagram illustrative of a second type of magnetic scanner consisting of at least one movable search coil moved in a predetermined two dimensional pattern over a selected region of the shadow image scan plane shown in FIG. 1;

FIGS. 6A, 6B and 6C are diagrams illustrative of rectilinear, circular/concentric, and spiral scan patterns;

FIGS. 7A and 7B are diagrams illustrative of two additional variations of spiral scan patterns;

FIG. 8 is an electrical block diagram illustrative of the signal converter utilized for the movable search coil scanner arrangement shown in FIG. 5; and FIG. 9 is an electrical block diagram illustrative of the signal converter circuitry utilized in connection with the stationary search coil array scanner configuration shown in FIG. 4.

DESCRIPTION OF THE PREFERRED EMBODIMENTS

Referring now to the drawings wherein like reference numerals refer to like elements, and more particularly to FIG. 1, there is disclosed a diagram illustrating the principle upon which the subject invention is based. It has been discovered that a diamagnetic metallic object 10 immersed in a magnetic induction field 12 generated by means of a magnetic "point" source 14 projects a shadow image 16 corresponding to the transverse cross section of the object 10 relative to the magnetic field's axis of symmetry 17. Where for example an imaginary reference plane or image projection plane 18 is located a distance $d_s$ from the magnetic point source 14, and the object 10 located intermediate the source and projection plane 18 at a distance $d_o$ from the projection plane, the magnetic source 14 is defined as being a point source when the angular size of the object subtended from a point in the plane of projection 18 is at least three times greater than the angular size of the source subtended from the same point in the plane of projection 18 providing a mutual relationship between the ratio of the mean cross sectional radius of the object $r_0$ to the separation distance between object and image plane $d_o$ being at least three times the ratio of the dipole source mean radius $r_s$ to the separation distance $d_s$.

The shadow image 16 under the aforementioned conditions is analogous to the shadow of an opaque object projected by an optical or X-ray point source, for example. This shadow region 16, moreover, exhibits a magnetic induction field decrease and phase change which follows sharply the projected transverse cross sectional outline of the immersed metallic object 10. Further-more, it has been observed that the magnitude of the induction field intensity of the shadow region 16 many diameters behind the object drops off by the inverse cube power of the distance from the object 10, i.e. $1/d_0^3$.

Referring to FIG. 2, reference numeral 14 now designates means for providing an AC point source magnetic induction field required to project a shadow image 16 of the metallic object 10 onto a predetermined plane of projection 18. In a preferred but not necessarily restricted embodiment, the phase and/or amplitude variation of the magnitude induction field 12 defining the shadow image 16 are sensed by locating magnetic receiver means comprising scanner means 20 at the plane or projection 18 to which are connected suitable electrical and/or mechanical scanner drive means 22 which are adapted to control a predetermined scan pattern over a predetermined region of the reference plane 18 encompassing both the shadow image 16 and the immediate surrounding area. The scanner means 20 has its output coupled to signal converter means 24 which are adapted to convert the sensed variations of the magnetic induction field 12 into electrical signals. These electrical signals are adapted to generate a visual image of the shadow 16 when applied to suitable display apparatus 26. The scanner device means 22 is additionally adapted to provide further reference and/or control signals to the signal converter 24 and the display apparatus 26.

As noted above, the magnetic dipole point source 14 comprises a source whose physical size is either small compared to the size of the metallic object immersed in its induction field 12 and/or is located at a separation distance from the image plane $d_s$ which is large compared to the separation distance between object and image plane $d_0$ as shown in FIG. 1. Preferably, the magnetic source 14 comprises an AC source having a frequency sufficiently high for eddy-current effects to cancel the ferromagnetic effects on the metallic object 10. Accordingly, the AC operating frequency is preferably in the range of at least 100kHz whereupon magnetic induction fields at these frequencies are adapted to penetrate rock, soil, water or masonry and are relatively harmless environmentally compared to X-ray systems, for example. In certain instances, however, it should be pointed out that a fixed permanent magnet or DC electromagnet can be utilized such as where perfect diamagnetic or super conducting objects are being investigated.

Accordingly, FIGS. 3A-3C disclose three typical examples of means for providing the magnetic point source 14. The configuration of FIG. 3A is intended to illustrate one example $14_a$ of a magnetic dipole source comprised of an AC induction coil 28 coupled to an AC generator 30 which may take the form of an oscillatory circuit configuration or suitable electromechanical generator operating at the required frequency. The configuration shown in FIG. 3B discloses a magnetic dipole source $14_b$ comprised of an Ac induction coil 28 driven by means of a pulse generator 32. A third means of providing a varying magnetic field 12 is shown in FIG. 3C wherein a small permanent magnet 34 or the like is mechanically rotated and or vibrated by means of electromechanical vibrator 36 on an axis 35 other than its rotational axis of symmetry 10. Thus the axis of rotation or vibration 35 is non-perpendicular to all points in the desired imaging area of the plane of shadow projection shown in FIG. 2.

Assuming now that the singular point source of magnetic energy 14 is projected towards the image projection plane 18, FIGS. 4 and 5 disclose two variations of magnetic scanner means 20 schematically shown in FIG. 2. Referring first to FIG. 4, reference numeral 38 designates a stationary array comprised, for example, of a plurality of individual induction search coils arranged in a predetermined configuration depending upon the desired mode of operation, typical examples being a rectangular matrix, a circle or a plurality of concentric circles, or one or more spirals. Each search coil consists of an inductor which is relatively small physically compared to the object's shadow to be imaged so that each coil is adapted to be responsive to a small increment of the total search area so that the projected shadow 16 (FIG. 2) is adapted to fall over a multiplicity of search coils while the remaining search coils of the array respond directly to the unobstructed magnetic field 12. Sequential sampling in a desired scan pattern is accomplished, for example, by applying a scan pattern control signal to an electrical commutator 39 coupled to the search coils in a well known manner. The control signal may be applied, for example, from the scanner drive means 22 (FIG. 2). Alternatively the sequential sampling may be provided by suitable electromechanical/electro-optical means, not shown. The sequential output from the array 38 is next fed to signal converter means 40 which is shown in greater detail in FIG. 8 wherein the phase/amplitude changes are incrementally detected by the array 38 and respectively converted to electrical signals such as video signals, which are then applied to an imaging display device 42 to provide a two dimensional X-Y television type display. Typically, the display device 42 includes a cathode ray tube 44 which is scanned in synchronization with the scan pattern control signal applied to the array. Such synchronization may be generated and applied, for example, from the scanner drive means 22 shown in FIG. 2.

Referring now to FIG. 5, the configuration shown therein depicts in block diagrammatic form at least one movable magnetic field sensing element e.g. a search coil 46 which is adapted to be moved in the projection plane in a two dimensional scan pattern by means of mechanical scanner apparatus 48 under control of a scan pattern generator 50 which is adapted to effect any desired type of scanning motion to sense the shadow image 16. The size of the inductor comprising the movable search coil 46 is again physically small compared to the object, size and shadow to be imaged. As the search coil 46 is moved in the projection plane 18, the phase and/or amplitude variations are continuously sensed and fed to a signal converter circuit 48 shown schematically in greater detail in FIG. 9. In a like manner the output of the converter 48 is fed to display device 42.

When desirable in both instances magneto-optical means including arrangements, not shown, utilizing the well known Faraday and Kerr effects may be substituted for the induction search coil configurations referred to above.

FIGS. 6A, 6B and 6C next are intended to illustrate three typical types of scan patterns which can be implemented by either of the configurations shown in FIGS. 4 and 5, be it an array 38 of search coils whose outputs are commutated in a predetermined scan pattern, or one or more movable search coils physically moved in a predetermined search pattern. FIG. 6A, for example, illustrates a rectilinear or raster type scan wherein consecutive sweeps in linear rows are developed, beginning from left to right, and top to bottom, with the same repetition being made over and over. As to FIG. 6B, there is disclosed what is referred to as a circular scan. In such a scan, ever increasing circular sweeps are generated concentrically, beginning, for example, at the center and moving outwardly; however, the reverse can also be implemented depending upon the desires of the user. As to FIG. 6C, there is shown what is referred to as a spiral scan. In such a scan, a sweep is made in a continually expanding spiral outwardly from the center. In all three cases, variations of these three types can be implemented when desired; however, in any event the scan pattern is made in the image plane 18 which, as noted before, is a plane perpendicular to and concentric with the axis of symmetry 17 of the magnetic dipole point source 14 shown in FIG. 1. It should also be pointed out with respect to the spiral scan pattern shown in FIG. 6C that whereas a single search coil can be scanned in a spiral pattern, when desirable the search coil array 38 shown in FIG. 4 can be configured in a spiral pattern, with the signals developed thereat simply outputted sequentially by means of a commutator.

Two other scanning methods are also contemplated for use in connection with the subject invention and are shown in FIGS. 7A and 7B. The configuration disclosed in FIG. 7A comprises a segmented spiral scan commonly referred to as a Nipkow scan and consists of a spiral array of small identical search coils 50 mounted on a rotatable member 52 having an axis of rotation 54 which is at least parallel, but preferably coincident with the axis of symmetry 17 of the magnetic dipole source 14 shown in FIG. 1. Additionally, the spiral array of coils 50 is partially shielded from the magnetic field 12 emanating from the point source 14 by means of a segmented magnetic shield member 54 interposed between the object 10 and the spiral coil array 50. The magnetic shield 54 includes a pie shaped aperture 56 extending from the rim to the center 58 which is also adapted to be coincident with the center 54 of the rotatable member 52. The search coil spiral array 50 have the individual inductor coils connected in series or parallel and are coupled through rotary coupling means, not shown, to a signal converter, not shown, which in turn is coupled to a display device in a manner referred to with reference to FIGS. 4 and 5.

Referring now to FIG. 7B, there is disclosed a scanning method known as a Palmer scan, whereby a single search coil 60, for example, is mounted on a rotatable member 62 which is adapted to rotate about a central axis 64 which is translated in the projection plane 18 along a fixed straight line 66, transverse the axis of symmetry 17 whereupon the search coil will move along a path describing a prolate cycloid. The phase-amplitude changes of the magnetic field 12 described by the shadow image 16 of the object 10 is coupled to rotary coupling means, not shown, and fed to a single converter in the manner described above, and applied to a cathode ray tube display device preferably in a manner to intensity modulate a circular Lissajous pattern, for example.

In all cases where movement of one or more search coils is affected, the primary purpose is to achieve a mutual movement between the magnetic point source 14 and the magnetic receiver means located at the image projection plane 18. Accordingly, when desired reversibility may be restored to and the scanning motion may be provided by moving the magnetic dipole source 14 while maintaining the field sensing means fixed. In other words, mechanical scanner apparatus 48 shown in FIG. 5 would be mechanically connected to the source in a manner analogous to the configuration shown in FIG. 3C.

Two forms of signal converter apparatus are shown in block diagrammatic form in FIGS. 8 and 9. In its simplest form, the circuit configuration shown in FIG. 8 is typical of a signal converter for a single mechanically scanned search coil like that shown in FIG. 5. The output from the search coil 46, for example, is first fed to amplifying means 68 which may consist of for example, an RF amplifier which is then coupled to a detector 70, which is adapted to rectify the RF signal and provide a video output signal. The video output signal is next coupled to a video amplifier 72. The video output signal from the amplifier 72 is suitable for application to the X-Y axis inputs of the cathode ray tube display device 42 for intensity modulating the electron beam in a well known manner. When desirable, a suitable impedance matching device 74 is connected between the output of the video amplifier 72 and input to the display 42.

With respect to an illustrative example of a signal converter for a search coil array such as shown in FIG. 4, reference is now made to FIG. 9 whereupon the array 38 is shown consisting of a plurality of like induction coils 76 coupled in groups of four to respective 4016 analog switches 78, which are adapted to operate to sequentially output each coil to a common RF amplifier 80 by means of a 7441 binary/decimal decoder 82 controlling the outputs of the analog switches 78. The decoder 82 in turn is driven by a 7490 decade counter 84 which operates in accordance with a binary digital clock signal coupled thereto from a clock source, not shown. The sequentially inputted signals to the RF amplifier 80 are, as in the case of the embodiment shown in FIG. 8, coupled to an RF detector 86 whose output in turn is coupled to a video amplifier 88. Amplifier 88 is coupled to the Y input of the cathode ray tube display device 42.

With respect to the amplifying means shown in FIGS. 8 and 9 and more particularly to the video amplifiers 72 and 88 shown in the figures, it should be pointed out that when rectilinear or raster type scanning is resorted to, the amplifiers are adapted to include well known compensating circuit means, not shown, for producing a constant output in the absence of a shadow 16 in the plane of projection 18 so that the effect of systematic voltage variations due to relative motion between magnetic receiver and transmitter during scanning is overcome. Such relative motion compensation, however, is not required for non-rectilinear scanning techniques such as circular, spiral, Nipkow and Palmer type scanning techniques illustrated above since equipotential lines of the magnetic induction point source tend to be followed and thus make these types of scans particularly adaptable for generating television type of images of the shadow sensed by the respective search coil(s) utilized.

Accordingly, while there has been shown and described what is at present considered to be the preferred embodiments in the subject invention, modifications thereby will readily occur to those skilled in the art. It is not desired, therefore, that the invention be limited to specific arrangements of components shown and described, but it is to be understood that all equivalents, alterations and modifications coming within the spirit and scope of the present invention are herein meant to be included.

I claim as my invention:

1. A point source projection magnetic induction imaging system for producing a visual display of a magnetic shadow or silhouette image of the external geometry of an object immersed in a magnetic induction field, comprising, in combination:

means generating a single non-scanning magnetic induction field point source relative to the size of said object and the respective distances of said point source and said object away from a reference plane, said reference plane being located behind said object a predetermined distance and substantially perpendicular to the axis of symmetry of the magnetic field transmitted from said point source wherein the mean transverse cross-sectional angle subtended by the source from a point in said reference plane is less than one-third the mean transverse cross-sectional angle subtended by the object from the same point in said reference plane;

magnetic receiver means, including means for providing a scanning operation thereof relative to said non-scanning point source, located at said reference plane and being operable to be responsive primarily to primary field variations of said point source induction field to thereby sense the magnetic shadow or silhouette image of said object cast on said reference plane, as opposed to responding primarily to secondary fields caused by eddy currents induced in said object, and outputting electrical signals accordingly;

electrical circuit means coupled to said receiver means and being responsive to said electrical signals during said scanning operation of said receiver means to produce imaging producing electrical signals therefrom; and visual display means coupled to said electrical circuit means and being responsive to said image producing electrical signals to produce a visual image of said magnetic shadow image.

2. The system as defined by claim 1 wherein said point source generating means comprises means generating an AC point source magnetic induction field.

3. The system as defined by claim 2 wherein said means for generating said AC point source magnetic induction field is operable at frequencies in the region of 100 kHz and above.

4. The system as defined by claim 1 wherein said receiver means includes a plurality of induction search coils arranged in an array substantially coextensive with said reference plane and additionally including means for outputting respective signals from a selected number of said induction search coils of said array in a predetermined scan pattern.

5. The system as defined by claim 4 wherein said search coil array is substantially stationary and is electrically scanned in a rectilinear pattern.

6. The system as defined by claim 4 wherein said array is substantially stationary and is electrically scanned in a circular pattern.

7. The system as defined by claim 4 wherein said search coil array is substantially stationary and is electrically scanned in a spiral pattern.

8. The system as defined by claim 1 wherein said receiver means includes at least one movable search coil in said reference plane and additionally including means coupled to said search coil for moving said search coil in a predetermined pattern over said reference plane.

9. The system as defined by claim 8 wherein said means for moving said at least one search coil comprises mechanical scanner apparatus and scan pattern generator means coupled to said mechanical scanner apparatus for defining the pattern of movement of said search coil in said reference plane.

10. The system as defined by claim 9 wherein said pattern of movement comprises a rectilinear scan pattern.

11. The system as defined by claim 9 wherein said pattern of movement comprises a circular scan pattern.

12. The system as defined by claim 9 wherein said movement comprises a spiral scan pattern.

13. The system as defined by claim 1 wherein said receiver means includes an induction search coil array mounted on a rotatable member located at said reference plane and having a surface, supporting said array, substantially coextensive therewith, and additionally including means interposed between said object and said array providing a partial magnetic shield for said array and additionally including means for rotation said member on an axis substantially parallel to said axis of symmetry of said point source.

14. The system as defined by claim 13 wherein said array comprises a signal array and magnetic shield is axially aligned with said rotatable member and includes an aperture diverging outwardly from substantially the center to its outer perimeter.

15. The system as defined by claim 1 wherein said electrical circuit means includes amplifier means and signal detector means for providing video electrical output signals, and wherein said visual display means comprises a device responsive to said video output signals for providing a television-like visual presentation of said magnetic shadow image of said object.

* * * * *